US010976432B2

(12) United States Patent
Schediwy et al.

(10) Patent No.: US 10,976,432 B2
(45) Date of Patent: Apr. 13, 2021

(54) ACOUSTIC LOCATIONING FOR SMART ENVIRONMENTS

(71) Applicant: Synaptics Incorporated, San Jose, CA (US)

(72) Inventors: Richard R. Schediwy, Union City, CA (US); Patrick A. Worfolk, San Jose, CA (US); Kirk Hargreaves, Mountain View, CA (US); Mihai M. Bulea, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 16/457,487

(22) Filed: Jun. 28, 2019

(65) Prior Publication Data

US 2020/0408906 A1 Dec. 31, 2020

(51) Int. Cl.
*G01S 15/04* (2006.01)
(52) U.S. Cl.
CPC .... *G01S 15/04* (2013.01); *G05B 2219/25062* (2013.01)
(58) Field of Classification Search
CPC ... G01S 5/18; G01S 5/26; G01S 15/04; G10L 2021/02166; G10L 25/30; G10L 25/51; G05B 2219/25062
See application file for complete search history.

(56) References Cited

U.S. PATENT DOCUMENTS

| 5,986,357 A * | 11/1999 | Myron ............ G06K 9/00362 307/116 |
| 6,590,661 B1 * | 7/2003 | Shnier ............... G01H 9/00 356/432 |
| 8,630,741 B1 | 1/2014 | Matsuoka et al. |
| 10,042,038 B1 * | 8/2018 | Lord ................. G01S 5/18 |
| 2014/0269193 A1 * | 9/2014 | Junkar .............. G01S 5/18 367/99 |
| 2015/0032456 A1 * | 1/2015 | Wait ................ G10L 15/26 704/275 |

(Continued)

FOREIGN PATENT DOCUMENTS

WO WO 2017088428 A1 * 6/2017 ............. G08C 23/02

OTHER PUBLICATIONS

Maxus Tech, website, Jun. 2019, retrieved from https://www.getwelle.com/, Maxus Tech.

(Continued)

*Primary Examiner* — Kidest Bahta
(74) *Attorney, Agent, or Firm* — Paradice & Li LLP

(57) ABSTRACT

Systems and methods for performing operations based on acoustic locationing are described. An example device includes one or more microphones configured to sense sound waves propagating in an environment. The example device also includes one or more processors and one or more memories coupled to the one or more processors. The one or more memories store instructions that, when executed by the one or more processors, cause the device to recover sound wave information from the sensed sound waves, detect a presence of one or more persons in the environment based on the received sound wave information, determine an operation to be performed by one or more smart devices based on the detected presence of one or more persons, and instruct the one or more smart devices to perform the operation.

20 Claims, 6 Drawing Sheets

(56) References Cited

U.S. PATENT DOCUMENTS

2015/0063074 A1* 3/2015 Oh .................. B60R 16/023
                                                    367/197
2015/0085619 A1* 3/2015 Jeong ................ G08C 23/02
                                                    367/198
2017/0004828 A1* 1/2017 Lee .................. G10L 15/25

OTHER PUBLICATIONS

Rajalakshmi Nandakumar, Alex Takakuwa, Tadayoshi Kohno, Shyamnath Gollakota. 2017. CovertBand: Activity Information Leakage using Music. Proc. ACM Interact. Mob. Wearable Ubiquitous Technol. 1, 1, Article 87 (Sep. 2017), 24 pages. https://doi.org/10.1145/3131897.

Low, Cherlynn; Google Nest Ultrasound Sensing article from Endgadget blog dated Oct. 15, 2019; available at https://www.engadget.com/2019/10/15/google-nest-ultrasound-sensing-hands-on-hub-max-hub-mini/; printed from the internet on Oct. 23, 2019; 15 pages.

\* cited by examiner

ACOUSTIC LOCATIONING FOR SMART ENVIRONMENTS

TECHNICAL FIELD

The present embodiments relate generally to acoustic locationing, and specifically to device or system control in a smart environment based on acoustic locationing.

BACKGROUND

Smart homes and other smart environments include one or more devices to be controlled without a user physically manipulating the device. A smart home hub may be connected to a user's wireless router to cause routines to be performed for different circumstances. For example, when the smart home hub identifies that the user's smartphone has recently connected to the wireless router (such as the user walking to the front door), the smart home hub may perform the routine, instructing, e.g., house lights to turn on, a stereo to play music, a thermostat to change the temperature, etc., welcoming the user home without the user manually interacting with the specific devices. As smart environments continue to evolve, additional means for controlling devices without requiring manual user interaction may be beneficial.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

An example device for performing one or more operations based on acoustic locationing is described. The example device includes one or more microphones configured to sense sound waves propagating in an environment. The example device may also include one or more loudspeakers configured to emit the sound waves, sensed by the one or more microphones, into the environment. The example device also includes one or more processors and one or more memories coupled to the one or more processors. The one or more memories store instructions that, when executed by the one or more processors, cause the device to recover sound wave information from the sensed sound waves, detect a presence of one or more persons in the environment based on the received sound wave information, determine an operation to be performed by one or more smart devices based on the detected presence of one or more persons, and instruct the one or more smart devices to perform the operation.

An example non-transitory, computer-readable medium including instructions is also described. The instructions, when executed by one or more processors of a device, cause the device to sense, by one or more microphones, sound waves propagating in an environment, recover sound wave information from the sensed sound waves, detect a presence of one or more persons in the environment based on the sound wave information, determine an operation to be performed by one or more smart devices based on the detected presence of one or more persons, and instruct the one or more smart devices to perform the operation.

An example method is also described. The method includes sensing, by one or more microphones, sound waves propagating in an environment, recovering sound wave information from the sensed sound waves, detecting a presence of one or more persons in the environment based on the sound wave information, determining an operation to be performed by one or more smart devices based on the detected presence of one or more people, and instructing the one or more smart devices to perform the operation.

BRIEF DESCRIPTION OF THE DRAWINGS

The present embodiments are illustrated by way of example and are not intended to be limited by the figures of the accompanying drawings.

DETAILED DESCRIPTION

Figure 1:
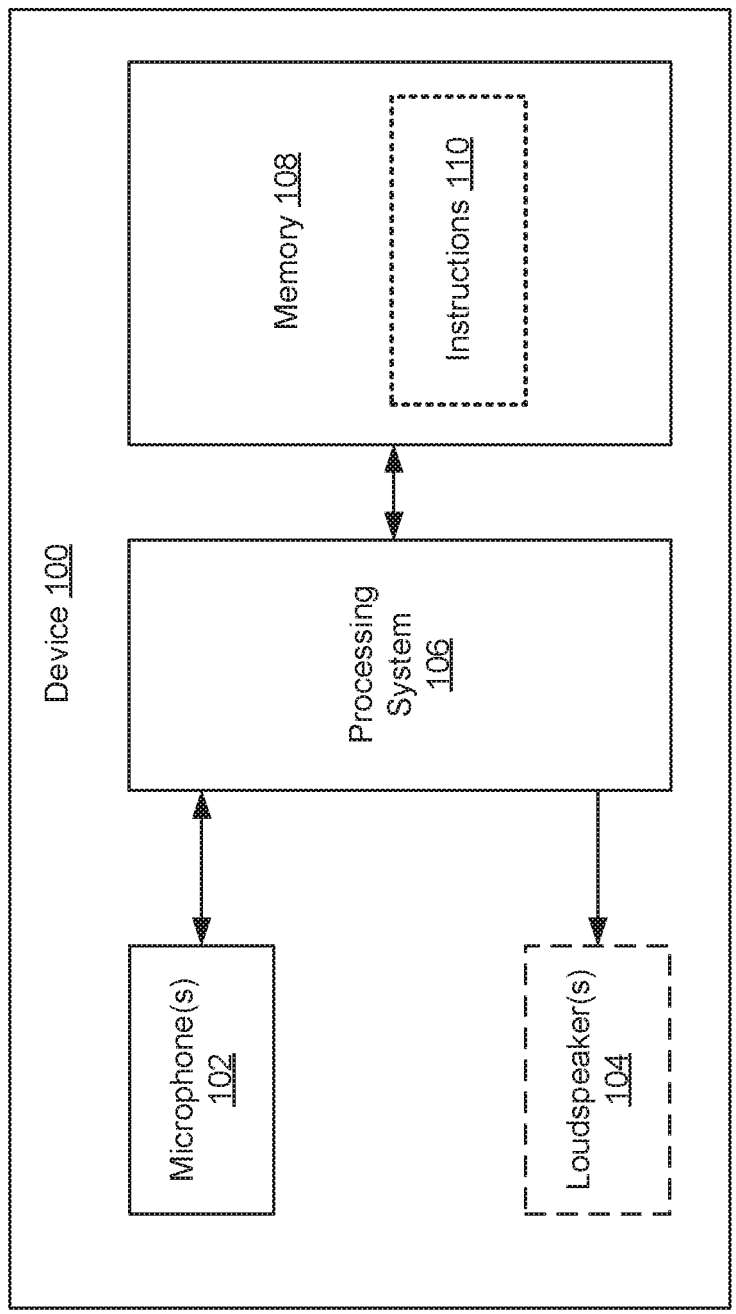
FIG. 1 illustrates a block diagram of an example device for which the present embodiments may be implemented.

A smart home or other smart environment may include one or more operations to be performed by devices without the user physically interacting with each device. For example, a user's smartphone may connect to a smart home's wireless network when a user approaches the front door, and a smart home hub may cause the front door lights to turn on, welcoming the user, based on the smartphone connecting to the wireless network. Other example devices that may be controlled include smart thermostats, smart lights, sound systems, smart loudspeakers, a smart oven or other smart kitchen devices, a smart water heater, etc.

A location of a user within the home or an interior space may be helpful in determining what operations are to be performed. For example, if a user moves from a kitchen to a living room, the user may want the lights in the kitchen turned off or dimmed and the lights in the living room turned on. A smart system (such as the smart home or other smart environment) therefore may need to identify the location of a user to determine what operations to perform. For example, a smart hub may need to determine the user's location in order to determine how to instruct the kitchen lights and the living room lights coupled to the hub.

A user's location may be determined, e.g., using global positioning system (GPS) signals, using Wi-Fi locationing, or using visible light or heat cameras. However, problems exist with such locationing systems. For example, the systems may require the user to install expensive hardware. Additionally, GPS and Wi-Fi systems may require the user to carry a wireless communication device, such as a smartphone. Further, cameras require line of sight (LoS), and users may have privacy concerns regarding cameras recording video.

In some aspects, sound waves may be used to determine the location and other locationing features of a user. Sound may be referred to interchangeably as acoustic or other suitable terms. Additionally, for purposes of this disclosure, sound or acoustic waves are not limited to audible sound waves for people or animals. Sound waves may include infrasonic, sonic, and/or ultrasonic waves transmitted by one or more loudspeakers. In one example, sound waves may include waves of any frequency up to 100 kHz. In some implementations, loudspeakers with a frequency range of emitting waves up to 18 kHz may be instructed to emit sound waves in the upper portion of the range (e.g., 16-18 kHz) to be used for locationing. Additionally, or alternatively, music or other audio played by a loudspeaker may be used in performing acoustic locationing. In some other implementations, an ultrasonic loudspeaker (e.g., a loudspeaker with a frequency range above 18 kHz) may be configured to emit inaudible signals to perform acoustic locationing.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. The interconnection between circuit elements or software blocks may be shown as buses or as single signal lines. Each of the buses may alternatively be a single signal line, and each of the single signal lines may alternatively be buses, and a single line or bus may represent any one or more of a myriad of physical or logical mechanisms for communication between components.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described. The non-transitory computer-readable storage medium may form part of a computer program product, which may include packaging materials.

The non-transitory processor-readable storage medium may comprise one or a plurality of random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein may refer to one or a plurality of any general purpose processor, conventional processor, controller, microcontroller, and/or state machine capable of executing scripts or instructions of one or more software programs stored in memory.

Many smart systems include one or more loudspeakers and one or more microphones throughout the environment. For example, a smart home may already include a stereo system, television loudspeakers, a soundbar, and/or smart loudspeakers (such as a smart home assistant). Additionally, the smart home may include microphones integrated into smart appliances, smart home assistants, or other IoT devices. Some devices, such as smart home assistants, may include both microphones and loudspeakers. For example, an Amazon® Echo device and a Google® Home device include a plurality of far-field microphones and one or more loudspeakers. Such devices may also be coupled to a separate loudspeaker, such as a soundbar or wireless loudspeakers.

In some aspects, existing microphones in a smart environment may be used to perform acoustic locationing. A loudspeaker may emit sound waves at a determined frequency, and the sound waves may reflect off an object (e.g., a user) and to the existing microphones. The received reflections may be sensed by the microphones, and a device coupled to the microphones may determine the location of the object based on the sensed reflections (e.g., using the location(s) of the loudspeaker(s), the time of transmission by the loudspeaker(s), and/or the angle(s) or arrival of the signals). The determined object location may then be used in performing one or more operations in the smart environment.

The microphones used for acoustic locationing may concurrently sense a frequency range of acoustic signals including audible signals for user interaction and other signals for acoustic locationing. For example, a microphone may have a frequency range up to 100 kHz, and the microphone may sense signals of a user's voice (such as for voice commands) in a frequency range below 18 kHz while, at the same time, sensing signals for acoustic locationing in a frequency range, e.g., above 20 kHz. In this manner, acoustic locationing may be performed without interfering with conventional operations of a device in a smart environment.

Turning now to the figures, FIG. 1 illustrates a block diagram of an example device 100, in accordance with some embodiments. The example device 100 includes or is coupled to one or more microphones 102, a processing system 106 and a memory 108 including instructions 110. The example device 100 may optionally include or be coupled to one or more loudspeakers 104. The device 100 may include additional features or components not shown. In one example, the device 100 may include or be coupled to additional input/output components, such as a display, a camera, a wireless interface, a keyboard, etc.

Some examples of the device 100 may include a smart loudspeaker or smart home assistant including a plurality of far-field microphones 102 and one or more loudspeakers 104. However, other suitable devices may be used, including a laptop computer, desktop computer, smartphone, tablet, or other suitable devices including or coupled to one or more microphones 102. While aspects of the disclosure are described with reference to the example device 100, the disclosure is not limited to any specific device.

The one or more microphones 102 are configured to sense sound waves in a range of frequencies. For example, the microphones 102 may be configured to sense ultrasonic sound waves emitted by the one or more loudspeakers 104 for acoustic locationing in addition to sensing other sound waves (such as a user's voice, sound waves for music or radio from the loudspeakers 104, etc.). In some implementations, one or more loudspeakers 104 are configured to emit sonic waves with frequencies up to, e.g., 18 kHz or 20 kHz. In some other implementations, one or more loudspeakers 104 are configured to emit ultrasonic waves with frequencies greater than 18 kHz. The one or more loudspeakers 104 may include a plurality of loudspeakers with different frequency ranges. In one example, a first subset of the loudspeakers 104 may emit sound waves in a sonic frequency range (such as for music, radio, user interaction, etc.), and a second subset of the loudspeakers 104 may emit sound waves in an ultrasonic frequency range (such as for acoustic locationing). The effective range of the one or more microphones 102 may be greater than an effective range of frequencies of an individual loudspeaker of the one or more loudspeakers 104. In this manner, the one or more microphones 102 may be configured to sense signals at different frequencies from different speakers 104.

The memory 108 may include one or more memories and may be a non-transient or non-transitory computer readable medium storing computer-executable instructions 110 to perform all or a portion of one or more operations described in this disclosure. For example, the instructions 110 may be executed to cause the device 100 to determine a location of an object based on the sensed sound waves from the one or more microphones 102. The memory 108 may also include instructions for performing one or more smart environment operations based on the object locationing information (such as the object's location or movement), and for performing other operations of the device 100.

The processing system 106 may include one or more processors capable of executing scripts or instructions of one or more software programs (such as instructions 110) stored within the memory 108. In additional or alternative aspects, the processing system 106 may include integrated circuits or other hardware to perform functions or operations without the use of software. While shown to be coupled to each other via the processing system 106 in the example device 100, the processing system 106, the memory 108, the microphones 102, and the loudspeakers 104 may be coupled to one another in various arrangements. For example, the processing system 106, the memory 108, the microphones 102, and/or the loudspeakers 104 may be coupled to each other via one or more local buses (not shown for simplicity).

The following examples are described regarding the device 100 performing one or more operations. The device 100 performing an operation may correspond to one or more device components performing the operation. For example, the device 100 determining an object location may correspond to the processing system 106 executing instructions 110 to perform the determination. In another example, while the device 100 is illustrated as including or coupled to the microphones 102, the device 100 may be removed from the microphones 102 and loudspeakers 104. For example, a smart home assistant may emit sound waves and sense the reflections using its own loudspeakers and microphones, and the information regarding such signals may be provided to the device 100 (such as a smart home hub or central processing system for a smart environment) for the device 100 to determine a location of an object. Alternatively, the smart home assistant may be the device 100 in determining a location of an object. The examples are provided solely to illustrate aspects of the disclosure, and any suitable device or device components may be used to perform the operations.

Figure 2:
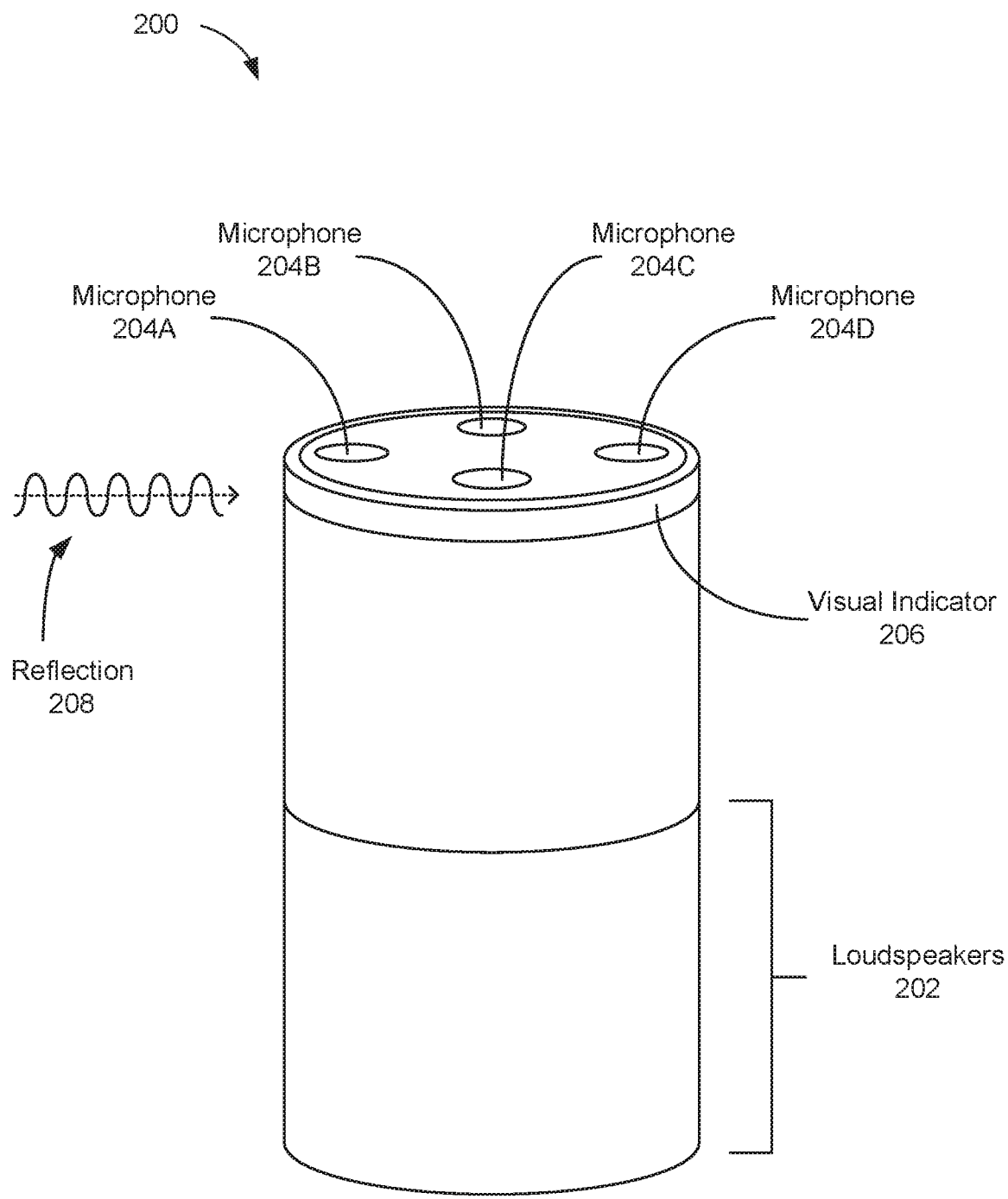
FIG. 2 illustrates an example smart home assistant.

FIG. 2 illustrates an example smart home assistant 200. The smart home assistant 200 may be an example implementation of the device 100 in FIG. 1. As illustrated, the smart home assistant 200 may include a plurality of loudspeakers 202, a plurality of microphones 204A-204D, and a visual indicator 208. The loudspeakers 202 may include: one or more subwoofers configured to produce low frequency (e.g., 20 Hz to 100 Hz) sound waves; one or more woofers configured to produce mid-range frequency (e.g., 50 Hz to 5 kHz) sound waves; one or more midrange woofers configured to produce slightly higher frequency (e.g., 300 Hz to 6 kHz) sound waves; and/or one or more tweeters configured to produce higher frequency (e.g., 2 kHz to 20 kHz) sound waves. The sound waves may be emitted in specific directions by one or more loudspeakers 202 (such as directional loudspeakers oriented to emit sound waves in a specific direction), or the soundwaves may be emitted omnidirectionally by one or more loudspeakers 202.

In some implementations, the loudspeakers 202 may also include one or more ultrasonic speakers to produce sound waves with frequencies greater than 18 kHz or 20 kHz (such as up to 100 kHz). For example, a tweeter or other suitable loudspeaker 202 may be configured to produce and emit ultrasonic sound waves or other suitable high frequency sound waves (e.g., greater than 18 kHz) not perceived by users. In this manner, such sound waves may be emitted when the smart home assistant 200 is to remain silent or in addition to sound waves at other frequencies (such as music), and the ultrasonic sound waves may be used for locationing purposes without interfering with other functions of the smart home assistant 200.

In some implementations, the microphones 204A-204D may be far-field microphones disposed on top of the smart home assistant 200. While the smart home assistant 200 is illustrated as including four microphones 204A-204D, the smart home assistant 200 may include any suitable number of microphones. For example, the smart home assistant 200 may include seven or more microphones disposed toward the edge of the top of the smart home assistant 200. The microphones 204A-204D may have a frequency response that includes the frequency range of sound waves to be used for locationing in addition to the frequency range of sound waves to be used for user interaction. For example, if ultrasonic sound waves with a frequency range up to 100 kHz are emitted by the loudspeakers 202 for performing locationing and sonic sound waves with a frequency range down to 10 Hz are emitted by the loudspeakers 202 for music, radio, user interaction, etc., the frequency response of the microphones 204 may be at least from 10 Hz to 100 kHz. Since the microphones 204A-204D may be multi-purpose sensors (such as for locationing and for user interaction), the smart home assistant 200 may parse signals from the microphones 204A-204D into separate signals for use in performing the different functions. For example, sensings of sound waves in sonic frequencies may be separated from sensings of sound waves in ultrasonic frequencies for the microphones to be used in concurrently performing user interaction (based on sound waves in sonic frequencies) and locationing (based on sound waves in ultrasonic frequencies).

The microphones 204A-204D may be disposed on top of the smart home assistant 200 such that the time and/or phase of the sound waves received at one microphone differs from when the sound waves are received at the other microphones. The difference in time and/or phase between the microphones 204A-204D may indicate the location of the source of the sound waves (such as the direction of the source from the smart home assistant 200). To illustrate, reflection 208 may be a reflection of emitted sound waves from the loudspeakers 202. For example, an object (such as a user, a chair, a bed, etc.) may be in the direction of microphone 204A from the smart home assistant 200. In this manner, the object reflects the sounds waves, which includes reflection 208 that reflects back toward the smart home assistant 200. Microphone 204A receives the reflection 208 before microphones 204B and 204C, which receive reflection 208 before microphone 204D.

The direction of the source of the reflection 208 from the smart home assistant 200 may be based on the order at which the microphones 204A-204D receive an instance of the reflection 208. For example, phase differences of the reflection 208 received by the different microphones 204A-204D may indicate the direction of the source of the reflection 208 relative to the smart home assistant 200. In some implementations, the smart home assistant 200 may determine phase differences among the signals generated by the microphones 204A-204D sensing the reflection 208. The phase differences among the microphones 204A-204D may then be compared to determine the direction of the object relative to the smart home assistant 200.

In some implementations, the smart home assistant 200 may use time-of-flight (ToF) of the sound waves to determine the depth/distance of an object from the smart home assistant 200. For ToF, the smart home assistant 200 determines a time between emitting a sound wave by the loudspeakers 202 and receiving the sound wave by the microphones 204A-204D. The smart home assistant 200 may therefore determine the round-trip distance traveled by sound waves based on the speed of the sound wave and the round-trip time. In some examples, the depth of the object from the smart home assistant 200 may be half the round-trip distance (assuming no additional reflections of the sound wave). Multiple round-trip times and distances may be determined for a sound wave, as the sound wave may disperse and reflect off multiple objects. In this manner, depths of different objects relative to the smart home assistant 200 may be determined.

Multiple instances of using ToF measurements for a plurality of sound waves may be performed over time, and the measurements may be used by the smart home assistant 200 to determine the depths of objects from the smart home assistant 200 (including accounting for multiple reflections, filtering round trip time calculations for an object, etc.). In this manner, the smart home assistant 200 (or another suitable device) may determine the direction (based on, e.g., phase differences from the signals from the microphones) and the depth (based on, e.g., ToF of the sound waves) of one or more objects relative to the smart home assistant 200. While determining ToF and depths are described with respect to sound waves emitted by the loudspeakers 202, ToF may be determined for sound waves emitted from other loudspeakers if the beginning time for emitting the sound wave is known (such as being provided to the smart home assistant 200 by the device emitting the sound wave).

The smart home assistant 200 may also be configured for a user to physically interact with the smart home assistant 200. For example, the smart home assistant 200 may include one or more buttons (not illustrated) to, e.g., adjust the volume of one or more of the loudspeakers 202, mute or disable the microphones 204A-204D, activate the microphones 204A-204D, power on or power off the smart home assistant 200, or any other suitable operation. In some example implementations of disabling the microphones 204A-204D, the smart home assistant 200 may disable the microphones for a portion of the frequency range while continuing to use the microphones for a different portion of the frequency range. For example, the microphones 204A-204D may be disabled from sensing sonic frequency sound waves (to prevent recording a person's speech) while still allowing sensing of ultrasonic sound waves (to continue performing acoustic locationing).

The visual indicator 208 may be configured to provide to the user a visual indication of the operating state of the smart home assistant 200. For example, the visual indicator 208 may be one or more lights configured to change color, flash, turn on or off, or other suitable means for indicating an operating state of the smart home assistant 200 (such as when the smart home assistant 200 is updating its software, recording via the microphones 204A-204D, playing music, indicating the volume of the loudspeakers 202, etc.). The smart home assistant 200 may include other control inputs or indicators, such as a touchpad, a vibration motor for vibrating the device, a display, etc.

Since the smart home assistant 200 may include loudspeakers 202 and microphones 204, the smart home assistant 200 may not require additional equipment for performing acoustic locationing. For example, the smart home assistant 200 may include a processing system (such as the processing system 106 of FIG. 1) to determine one or more objects' locations based on the emitted sound waves by the loudspeakers 202 and the received reflections of those soundwaves by the microphones 204. In some other implementations, the information regarding the emitted and received sound waves by the smart home assistant 200 may be provided to a processing system external to the smart home assistant 200 (such as a smart home hub, a server, or other computer coupled to the smart home assistant).

Acoustic locationing may be used to determine the locations or other locationing information of multiple objects in an environment. For example, if the smart home assistant 200 is located in a living room with furniture, such as a couch, a recliner, a coffee table, and an entertainment center, the microphones 204 may receive reflections of the sound waves from the pieces of furniture in the living room. Since furniture is not moved frequently, changes to reflections expected based on previously received reflections of the surroundings may indicate the presence, and be used to determine the location, of a person or new object.

If the environment of the smart home assistant 200 is static, the sound wave reflections received from the environment are substantially the same over time (notwithstanding slight variations of the sensed reflections may be caused by environmental conditions, such as ambient temperature, air currents, etc.). In some implementations, the smart home assistant 200 may generate a baseline for use in object detection and locationing when the environment is static. A baseline is a reference of reflections received from a static environment for the smart home assistant 200. The reference may be a depth map of the environment, a list of received signals indexed by the microphones 204A-204D, spatial coordinates around the smart home assistant 200 or other suitable index, one or more variables for processing signals from the microphones 204A-204D for locationing (such as removing the baseline from the generated signals), or any other suitable means more generating the baseline.

The smart home assistant 200 may compare received reflections to the baseline. If the comparison indicates that the reflections are different from the baseline by more than a determined delta, the smart home assistant 200 may determine that there are additional objects or movement in the environment. For example, the smart home assistant 200 may generate a depth map for sound waves received, and the smart home assistant 200 may compare the depth map to the baseline. An example comparison of depth maps with a resolution of X columns and Y rows (in a Cartesian coordinate system) is provided in equation (1) below:

$$\text{Difference}(x,y) = |\text{Current Depth Map}(x,y) - \text{Baseline}(x,y)| \quad (1)$$

for $x \in X$ and $y \in Y$

In some implementations, the smart home assistant 200 may generate a depth map and perform other operations in a Polar coordinate system. For example, an example comparison of depth maps with a resolution of a distance set R and an angle set $\Theta$ from the smart home assistant 200 is provided in equation (2) below:

$$\text{Difference}(r,\theta) = |\text{Current Depth Map}(r,\theta) - \text{Baseline}(r,\theta)| \quad (2)$$

for $r \in R$ and $\theta \in \Theta$

While Cartesian coordinate and Polar coordinate systems are illustrated as examples, any suitable mapping or coordinate system may be used.

In one implementation, the smart home assistant 200 may determine that the current depth map differs from the baseline based on the summation of the differences across the pixels (e.g., (x,y) or (r,θ)) being greater than a determined threshold. The threshold may take into account slight variations in values caused by ambient conditions, such as wind, temperature, etc. In another implementation, the smart home assistant 200 may determine that the current depth map differs from the baseline based on a threshold number of pixels having a difference between the depth map and the baseline greater than a difference threshold (e.g., more than 10 percent of the pixels have a different greater than a threshold). Any suitable comparison of the received signals (such as a depth map) and the baseline may be performed. Additionally, or alternatively, the thresholds may be adjusted based on false positives, changes in ambient conditions, or other suitable factors to improve object detection and locationing.

If a change in the environment is identified, the smart home assistant 200 may discern whether the change is a change in the static environment (such as moved furniture, new furniture or objects to exist in the environment, etc.) or whether a person or transient object is located in the environment. If the new depth map differs from the baseline but subsequent depth maps for a period of time after the new depth map do not differ from the new depth map, the smart home assistant 200 may update the baseline as the static environment has changed. For example, if a couch is moved in the environment, and the smart home assistant 200 identifies the change in the environment for, e.g., one minute or another threshold amount of time with no other changes (such as people moving through the environment), the smart home assistant 200 may update the baseline to account for the new position of the couch.

Since a person in an environment does not stay as still as an inanimate object, the smart home assistant 200 may determine that subsequent depth maps differ over time as one or more people are in the environment. The smart home assistant 200 may thus determine a person in the environment if subsequent depth maps differ from one another during a threshold amount of time. In some implementations, the smart home assistant 200 may also determine that one or more people are in an environment based on the microphones 204A-204D sensing voices in addition to reflections for locationing.

In addition to identifying whether one or more people exist in the environment, or changes in the static environment, the smart home assistant 200 may use acoustic locationing to determine the motion or movement of one or more objects in an environment. For example, if a person is walking around a room including the smart home assistant 200, the reflections of the sound waves of the person may change, and the changes may be used to determine the movement of the person in the room. The determined movement may include, e.g., the speed that the person is moving about the room, the direction of movement, whether the person is about to leave the room (such as to another room for another device to record reflections of sound waves for acoustic locationing), whether the person is approaching a specific object in the room (such as approaching the television or another object with which the user intends to interact), and whether the user is approaching an occlusion in the environment.

In a smart environment, acoustic locationing may be preferable over other existing locationing techniques (such as those which rely on global positioning system (GPS) signals, radio waves, optics, etc.). For example, a GPS receiver requires line of sight (LoS) with multiple satellites in earth's orbit, which may not be possible indoors. Additionally, a user is required to carry a GPS receiver (such as a smartphone) when using GPS locationing. A smart system having multiple Wi-Fi access points installed to provide Wi-Fi locationing of the user or other objects requires special Wi-Fi equipment which may be expensive and difficult to integrate. Additionally, people may be concerned about radiation and emissions from so many radio waves. One or more cameras (such as for visible light or infrared) capturing a succession of images (such as video) for performing locationing may require additional equipment installed in a home or environment. Additionally, people may have privacy concerns of being visually recorded. Furthermore, cameras may not work for locationing in dark rooms (where no ambient light is present).

Figure 3A:
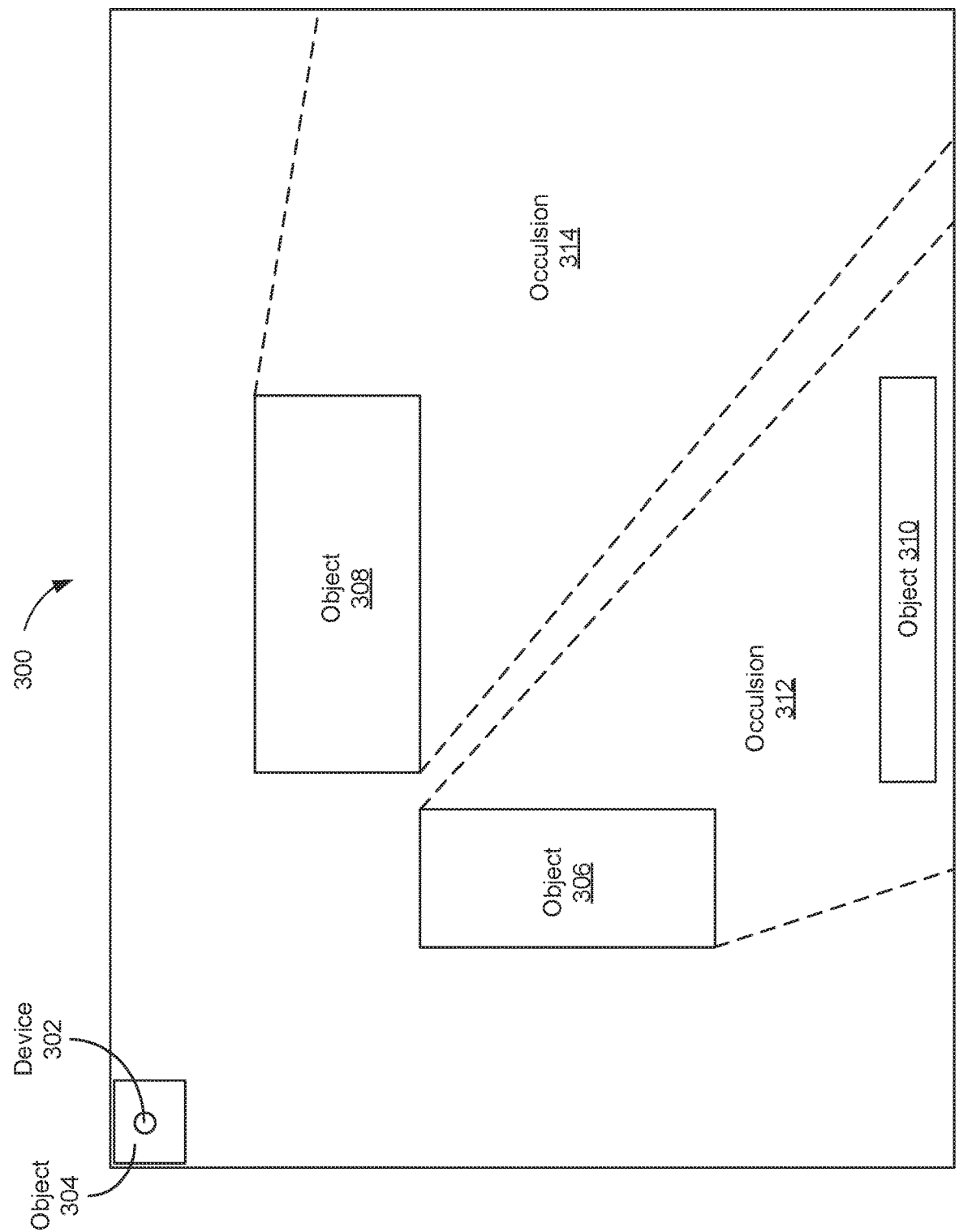
FIG. 3A illustrates an example static environment in which acoustic locationing may be performed.

Referring to an example implementation of acoustic locationing for illustrative purposes, FIG. 3A illustrates an example static environment 300 in which acoustic locationing may be performed. The environment 300 may be a room including a device 302 and objects 304-310. The device 302 may be a smart home assistant (such as the smart home assistant 200 of FIG. 2) or an example of a device 100 for acoustic locationing. In the example of FIG. 3A, object 304 may be a table on which the device 302 is placed, objects 306 and 308 may be a loveseat and couch, and object 310 may be an entertainment center or television. The objects 304-310 may create occlusions in the room of which are not in the LoS of the device 302. For example, object 306 may cause occlusion 312, and object 308 may cause occlusion 314. Disregarding differences between the heights of objects 304-310 and/or the height of the device 302, object 310 may be within the occlusions 312.

Sound waves may be emitted by the device 302 and reflect off multiple surfaces in the room. For example, sound waves may reflect off walls and objects 306 and 308 that are within line of sight (LoS) of the device 302. Some of the reflections return to the device 302, which the microphones sense. The device 302 may then use the sensed reflections to determine the location of objects (such as in generating a depth map).

While some objects in occlusions may be detected by the device 302 based on the received reflections, the device 302 may be unable to accurately determine the locations of some objects in the occlusions of the environment 300 (such as object 310). For example, the sound waves emitted by the device 302 may reflect multiple times before reaching the object 310 in the occlusion 312 and may again reflect multiple times before returning to the device 302. As a result, the received reflections from the object 310 may be insufficient to generate a mapping of the object 310 in a depth map.

However, the reflections from the object 310 may be greater than noise attributed to ambient conditions. The device 302 may therefore generate a baseline including reflections of the occlusion 312, which includes the reflections from the object 312. In comparing new reflections of the occlusion 312 to the baseline, the device 302 may determine if there are changes in the occlusion 312. For example, if the object 310 is moved (such as a television turned toward the loveseat for viewing), the reflections from the occlusion 312 may change, and the device 302 may determine a change in the occlusion 312 when comparing the baseline to, e.g., a current depth map generated from the reflections after the television is moved. As described above, if the environment 300 is static for a threshold amount of time after the object 310 is moved, the device 302 may update the baseline for use in acoustic locationing.

Figure 3B:
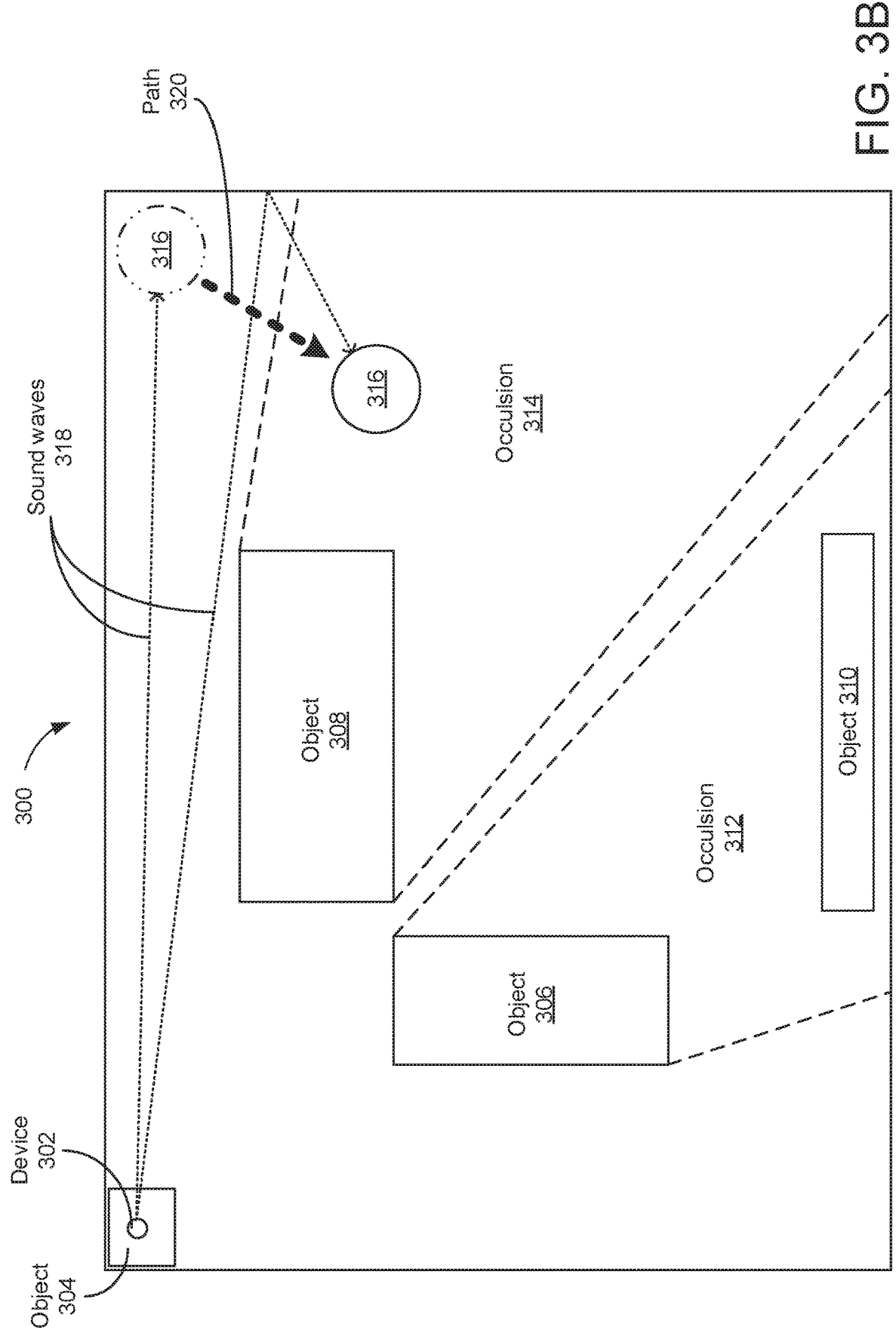
FIG. 3B illustrates the example static environment in FIG. 3A including a user entering and moving within the environment.

FIG. 3B illustrates the example static environment 300 including a user 316 entering and moving within the environment 300 (such as along the path 320). Referring back to FIG. 3A, the device 302 may store a baseline of the environment 300. When the user 316 (FIG. 3B) enters the environment 300, the reflections received by the device 302 may differ from the baseline, indicating a change in the environment 300. For example, sound waves 318 emitted by the device 302 may reflect off the walls and static objects in the environment 300 when the user 316 is not present, but the sound waves 318 (as shown in FIG. 3B) approach and reflect off the user 316. In this manner, the reflections from the sound waves 318 as received by the device 302 differ between when the user 316 is and is not present in the environment 300.

For example, the device 302 may use reflections of the sound waves 318 in generating a depth map including the user 316. In comparing the depth map to the baseline, the device 302 may determine the existence of a new object in the environment 300 (i.e., the user 316). As the user 316 moves along the path 320, subsequent depth maps show changes in the location of the user 316. In this manner, acoustic locationing may be used to track movements of the user 316 (or other objects). For example, the user 316 may move along path 322, and the device 302 may determine through multiple soundings and reflections that the user 316 is moving along the path 320, such as into the occlusion 314. In determining the movement of the user 316, the device 302 may determine the user's location, speed, trajectory, or other movement information.

As described above, the device 302 may not determine a user's location or movement information when the user 316 enters the occlusion 314. In some implementations, the device 302 may predict the location or other movement of the user 316 based on the path 322 and/or any other suitable trajectory information determined. In this manner, the device 302 may attempt to predict when the user 316 is to exit the occlusion 314 or other approximate information about a user's location or movement for operations to be performed by the smart environment. Such predictions may be used to reinforce any locationing performed for occlusions or may be used if sound waves are not reliably received from objects in the occlusion.

The sound waves 318 are shown as a line only for illustrative purposes. Sound waves may be emitted in a fan shape or omnidirectionally. Additionally, the reflections are shown as one reflection from each surface. However, sound waves may be scattered into multiple reflections by a surface. Additionally, sound waves may permeate through an object to reach one or more occlusions. The example sound waves 318 in FIG. 3B are solely for illustrative purposes in explaining concepts of the disclosure.

In some implementations of detecting a person (such as the user 316), the device 302 may differentiate between the user 316 and other objects based on the received reflections. For example, the user 316 may move more than other non-user or inanimate objects in the environment 300. In this manner, the device 302 may determine that an object is the user 316 based on the amount of movement. In another example, the user 316 wearing clothes may reflect fewer sound waves and at different angles than harder objects with static surfaces (such as a table). In this manner, the device 302 may determine that an object is the user 316 based on the intensities of the reflections and the angles at which the reflections are received.

The device 302 (such as a smart home assistant 200) or another suitable device of a smart environment may be configured to perform any suitable smart environment operation based on user/object location or other suitable positioning information (such as user movement, trajectory, etc.). For example, a smart device may be instructed to turn on or perform one or more operations based on the user located within a threshold distance of the smart device, the user's trajectory placing the user toward the smart device, the duration of the user being within a distance of the smart device, etc. Example operations include turning on a television when the user approaches, turning on lights when a user enters a room, turning on a refrigerator display when a user stands in front of the refrigerator, adjusting a temperature or other ambient conditions based on the location of the user, etc. Another example operation is adjusting the volume of a television or sound system based on the distance between the user and the television or sound system. For example, a smart home assistant 200 may adjust its volume for interaction with a user based on the distance from and location of the user in reference to the smart home assistant 200. A further example operation that may be performed is a speaker array may be steered to direct sounds toward a user based on a user location. For example, if a user is walking around the room, the speaker array may steer the sounds to focus on the user's location.

Another example operation that may be performed is adapting content of a display. In some implementations, the device 302 (FIG. 3B) may include a display for presenting information to people in the environment 300. The device 302 may be configured to adjust the font size, font thickness, contrast, type of amount of information to be presented, etc. based on the location or movement of the user 316. For example, when the user 316 is at least a threshold distance from the device 302, the device 302 may, e.g., use an increased font size, reduce the amount of information presented to the user 316, or prevent the display from presenting information to the user 316. For example, when the user 316 approaches the device 302 within a threshold distance, the device 302 may be configured to switch from showing a large clock indicating the time to a smaller clock and the weather or other information desired by the user 316.

Another example operation that may be performed is preventing false activations of operations by the smart environment. For example, the device 302 may determine the user 316 is located as shown in the environment 300 in FIG. 3B. The device 302 may also listen for a wake word or phrase for the user 316 to interact with the device 302. In response to sensing the wake word or phrase, the device 302 may determine the location of the source of the wake word or phrase. The device 302 may then compare the location of the source to the location of the user 316. If the location or direction of the user 316 and the location of the source are not approximately the same (such as not within a threshold distance from one another), the device 302 may determine that the sensed wake word or phrase is a false activation. In this manner, the device 302 may ignore the wake word or phrase. For example, the object 310 may be a television, and the wake word or phrase may be said during a commercial. The device 302 may determine the location or direction of the source of the wake word or phrase to be toward the object 310 (or the occlusion 312), which is not similar to the location or direction of the user 316 (even if in the occlusion 314). Therefore, the device 302 may ignore the wake word or phrase originating from the television.

A further example operation may include steering the microphones of a device 302. For the example of the smart home assistant 200, the smart home assistant 200 may include a plurality of far-field microphones 204A-204D disposed as a microphone array. The smart home assistant 200 may be configured to adjust the microphones 204A-204D to direct listening in a specific direction (steering the microphone array). For example, the smart home assistant 200 may be configured to adjust the phase of each signal from the microphones 204A-204D during processing to place the signals in phase for sounds originating from a specific location in the environment. In this manner, the smart home assistant 200 may perform one or more operations of steering the microphone array based on a direction of the user in reference to the smart home assistant 200. The smart home assistant 200 may also adjust the sensitivity of the microphones 204A-204D (such as for automatic gain control) in controlling the microphone array.

Another example operation may include determining whether another device other than the device 302 should be used for performing acoustic locationing. For example, a smart home may include a plurality of smart home assistants disposed throughout. A device 302 may determine that a user is exiting the environment 300 (such as a room) and entering another portion of a smart home including a different smart home assistant. The device 302 may thus determine that the other smart home assistant is to be used for acoustic locationing. In this manner, a smart home or environment may be configured to perform acoustic locationing only during the presence of a person. In some other implementations, one or multiple devices 302 may be used for acoustic locationing irrespective of the presence of a person. For example, acoustic locationing may be used for security purposes in detecting movement in the environment while the user is away.

In addition to the operations being performed based on a user location or movement, operations may also be based on the number of persons detected in an environment. For example, a device 302 may determine a number of people in an environment based on the number of additional objects detected in the environment. The device 302 may also determine an amount of ambient noise specific to the number of persons in the environment 300 (e.g., number of people talking, walking, etc.). If background music is playing, a sound system may be instructed to adjust the volume based on the number of people. For example, more people in a room (and thus more ambient noise) may mean the volume is to be increased for the music to be heard. In another example, a thermostat may be instructed to adjust the temperature based on the number of people, as an increase in the number of people may increase the amount of heat in a room for which the temperature may not be measured by the thermostat.

Figure 4:
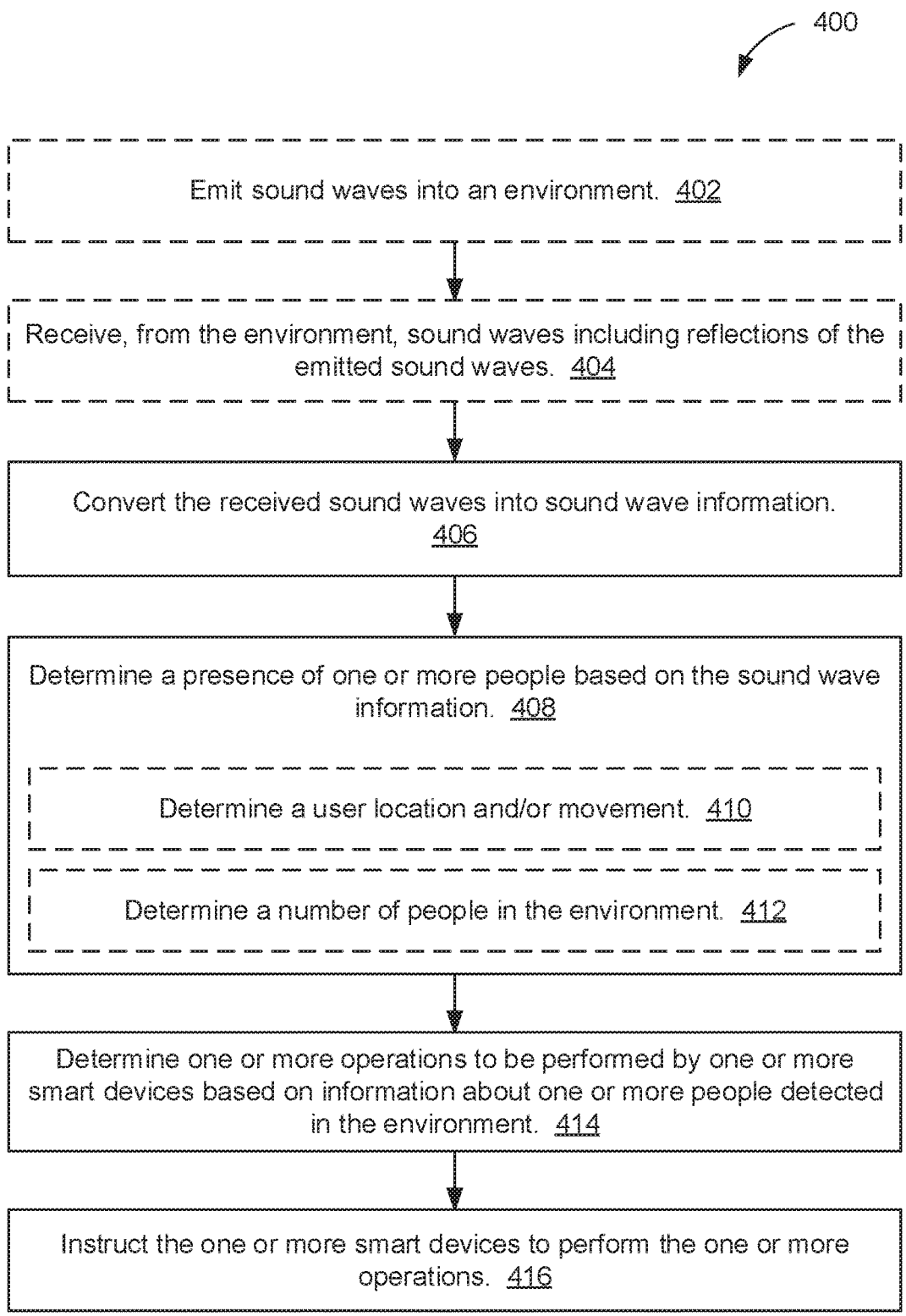
FIG. 4 is an illustrative flow chart for performing one or more smart environment operations based on acoustic locationing.

FIG. 4 is an illustrative flow chart 400 for performing one or more smart environment operations based on acoustic locationing. The process is described as being performed by a device 100, but any suitable device, component or number of devices/components may be used in performing the illustrated process. Beginning at 402, one or more loudspeakers 104 may emit sound waves into an environment of the device 100. For example, one or more loudspeakers 104 may emit ultrasonic frequency signals to be used for acoustic locationing. One or more microphones 102 may then receive from the environment sound waves including reflections of the emitted sound waves from the one or more loudspeakers 104 (404). The device 100 (such as the processing system 106) may convert the received sound waves into sound wave information (406). For example, the generated signals from the microphones 102 may be converted or used to generate a depth map of the environment.

While the above example describes one or more microphones 102 receiving reflections of sound waves emitted by one or more loudspeakers 104, in some other implementations, the one or more microphones 102 may receive sound waves emitted by other sources in an environment, such as a ticking clock, a loudspeaker playing music, a user talking or walking, separate loudspeakers emitting ultrasonic sound waves, etc. If the locations of the sources of the sound waves are known by the device 100, the device 100 may use the sound waves from the external sources in addition or alternative to using sound waves emitted from one or more loudspeakers 104 in performing acoustic locationing.

Proceeding to 408, the device 100 may determine a presence of one or more people based on the sound wave information. For example, the device 100 may compare the generated depth map to a baseline previously generated for the environment. Differences between the depth map and the baseline may indicate the location or movement of one or more people in the environment. In some examples of determining the presence of one or more people, the device 100 may determine a user location (such as direction or depth from the device 100) or movement (410). For example, the device 100 may determine a user's location in the environment and determine a path or other trajectory information of the user. Such information may be used to, e.g., determine that the user is approaching a smart home device, the vice 100, or another object in the environment for interaction, determine if the user is within a specific distance of a display for adapting the display's content, determine the direction of the user respective to the device 100 or another device for beam steering loudspeakers or microphones, etc. In some other implementations, the device 100 may also determine, based on the sound wave information, a number of people in the environment (412). The device 100 may also determine, based on the sound wave information, movements of the number of people in the environment.

The device 100 may then determine one or more operations to be performed by one or more smart devices based on information about one or more people detected in the environment (414). In one example, the device 100 may determine that a microphone array is to be steered based on a direction of a user from the device 100. In another example, the device 100 may determine that another device in the environment is to perform one or more operations based on a user location in reference to the other device (such as adjusting the volume of a television as the user moves away from the television, adjusting the lights based on the location of the user, adjusting the content of a display based on a depth of the user from the display, etc.). The operations may also be based on the user's movement and/or the number of people in the environment.

After determining the one or more operations to be performed, the device 100 may instruct the one or more smart devices to perform the one or more operations (416). The device 100 may be included in the one or more smart devices to perform the one or more operations. For example, the device 100 may instruct its microphone array to be steered in a specific manner based on the direction of the user in the environment. In another example, the device 100 may instruct another device to perform the one or more operations, and the other device may perform the one or more operations (such as a smart light switch adjusting the lights, a smart loudspeaker adjusting the volume, a smart thermostat adjusting the temperature, etc.).

As noted above, the device 100 may compare current sound wave information to a baseline in determining whether there exists a change in the environment of the device 100. For example, the device 100 may recover sound wave information from the sound waves received by the one or more microphones 102. In some example implementations, the device 100 may generate a depth map of its environment from the received sound waves. After recovering the sound wave information, the device 100 may compare the sound wave information to a baseline. For example, the device 100 may compare the generated depth map to a stored depth map that is the baseline of the environment for the device 100 (508).

If the differences between the sound wave information (such as a depth map) and the baseline are not greater than a threshold, the device 100 may determine there are no significant changes in the environment of the device 100. If the differences between the sound wave information (such as a depth map) and the baseline are greater than a threshold, the device 100 may identify that a change exists in the environment of the device 100. As noted above, the device 100 may determine if a summation of the differences between pixels in the depth map and the baseline is greater than a threshold, or the device 100 may determine if a threshold number of pixels of a depth map includes differences from the baseline greater than a threshold. Other suitable means for comparing the sound wave information and the baseline may also be performed in identifying whether changes exist in the environment of the device 100.

If the device 100 identifies that a change in the environment exists, the device 100 may determine whether the changes are attributed to one or more people being in the environment or whether the changes are caused by a change in the static environment (such as an inanimate object being moved to a new location). If the change is attributable to people in the environment, sound wave information (such as subsequent depth maps) may change over time in relation to the movement of the people. In this manner, the device 100 may track the movements of people in the environment. If the change is attributable to a change in the static environment (such as a couch being moved and remaining in a new position in the environment), the device 100 may update the baseline for acoustic locationing.

In some implementations, a device 100 may generate an initial baseline by generating a plurality of consecutive depth maps (or other sound wave information) and compare the depth maps over a period of time. If the depth maps do not change over a threshold amount of time (other than a threshold amount attributed to noise caused by ambient conditions), the device 100 may set an average depth map, median depth map, or otherwise generate a depth map from the compared depth maps as the baseline to be used for acoustic locationing. For example, if depth maps of the environment do not change for one minute or another suitable amount of time, the device 100 may generate the baseline based on the compared depth maps.

If the environment changes with new or moved inanimate objects (such as a moved chair, television, etc.), the new depth maps may differ from the baseline, but the new depth maps may not differ from one another after the object is placed or moved. The device 100 may therefore update the baseline to account for the new or moved object in the environment.

Figure 5:
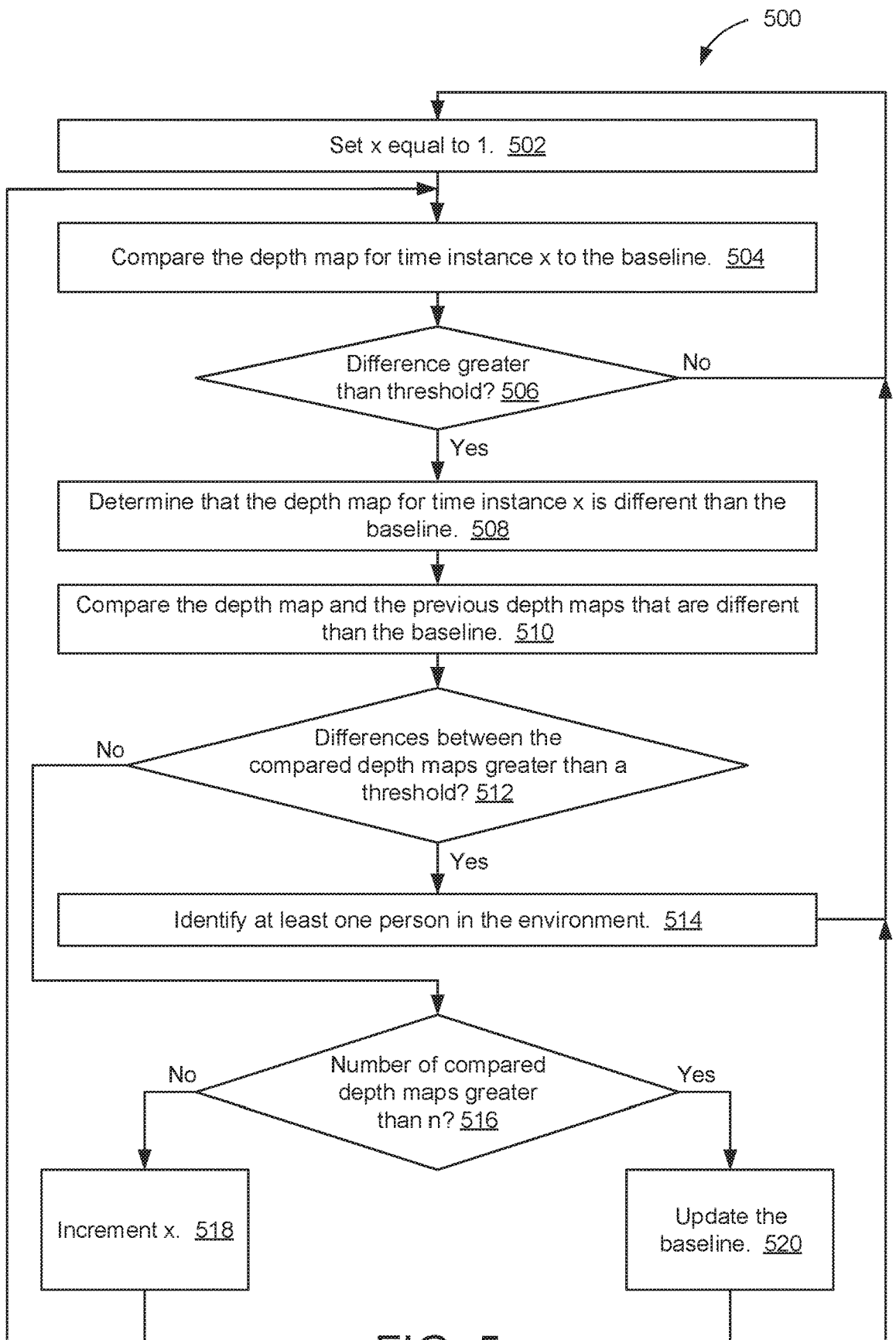
FIG. 5 is an illustrative flow chart for updating a baseline used by a device in performing acoustic locationing.

FIG. 5 is an illustrative flow chart 500 for a device 100 to update a baseline. For x set to 1 (502), the device 100 may compare a depth map of the environment for time instance 1 to the stored baseline (504). If the difference between the depth map and the baseline is not greater than a threshold (506), the device 100 may determine that there are no changes in the environment, and the process may revert to 502. If the device 100 determines that the difference between the depth map and the baseline is greater than the threshold, the device 100 may determine that the depth map for the time instance is different than the baseline (508). In this manner, the device 100 may determine that a change exists in the environment of the device 100.

The device 100 may therefore compare the depth map for the time instance to previous depth maps, if any, determined different from the baseline (510). For a first depth map different than the baseline, the device 100 may not compare the depth map to other depth maps. For a second depth map and subsequent depth maps determined to be difference from the baseline, the device 100 may compare the subsequent depth maps of the first depth map to determine if the depth maps are substantially the same.

If the differences between the compared depth maps are greater than a threshold (512), the device 100 may determine that at least one person exists in the environment (514). In this manner, the device 100 may not update or adjust the baseline, and the process may revert to 502. The device 100 may also determine to perform one or more operations based on the one or more people in the environment, such as described regarding step 414 in FIG. 4.

If the difference between the compared depth maps are not greater than the threshold, the device 100 may determine if the number of depth maps compared is greater than a threshold n (516). For example, the device 100 may periodically generate a depth map (such as once every 2 seconds or another suitable period), if the device 100 is to determine that the environment has not changed for a threshold amount of time (such as 1 minute) before updating the baseline, the device 100 may compare the number of subsequent depth maps generated during the threshold amount of time (such as n=1 minute/2 seconds per depth map=30 depth maps) to determine whether to update the baseline.

If the number of compared depth maps is not greater than the threshold number n (516), x may be incremented (518), and the process reverts to 504. In this manner, the device 100 may continue to compare the depth maps during the threshold amount of time to determine whether additional changes in the environment exist. If the number of compared depth maps is greater than the threshold number n (516), the device 100 may update the baseline based on the compared depth maps (520). In updating the baseline, the device 100 may generate a new depth map as the baseline, such as in generating the initial baseline. Alternatively, the device 100 may adjust the existing baseline based on the compared depth maps.

In this manner, the device 100 may continue to update the baseline while operating and performing acoustic locationing. In some implementations, when the device 100 starts up after being asleep or in a low power mode, the device 100 may initially use a previously generated baseline (such as the baseline used during last operation of the device 100). In some other implementations, the device 100 may generate a new baseline every startup. Additionally, or alternatively, a user may request the device 100 to generate a new baseline. For example, after moving furniture in a room, a user may interact with a smartphone application to command the device 100 to generate a new baseline to account for the moved furniture in the room.

While some examples have been provided to illustrate aspects of the disclosure, those of skill in the art will appreciate that additional implementations exist without deviating from the scope of the application. Additionally, those of skill in the art will appreciate information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. While sound waves are described in the examples as audio waves generated by an electronic device, any suitable sound waves may be used, such as ambient noise in the environment or noise made by one or more persons or objects (e.g., a ticking clock, passing cars, a user walking and talking, etc.). Additionally, while the examples are described as a device including both speakers and microphones, the microphones and/or the speakers may be separate from the device. For example, an environment may include a number of speakers distributed in the environment (such as a surround sound system), and the environment may also include a number of microphones distributed in the environment (such as existing microphones for computers, appliances, smart home assistants or loudspeakers, etc.). Further, while a device 100 or smart assistant 200 is described as performing acoustic locationing, processing of sound wave information may be performed in a distributed environment. For example, a smart assistant 200 may emit sound waves and receive reflections for acoustic locationing, and the received reflections may be converted to signals that are transmitted to another device for processing for acoustic locationing. As such, the specification and drawings are, accordingly, to be regarded in an illustrative sense rather than a restrictive sense.

What is claimed is:

1. A device, comprising:
   one or more loudspeakers configured to emit sound waves to propagate in an environment, wherein the sound waves include ultrasonic sound waves for acoustic locationing;
   a plurality of microphones configured to sense one or more reflections of the ultrasonic sound waves propagating in the environment;
   one or more processors; and
   one or more memories coupled to the one or more processors, the one or more memories storing instructions that, when executed by the one or more processors, cause the device to:
      recover sound wave information from the one or more sensed reflections of the ultrasonic sound waves;
      determine a location of one or more people in the environment based on the sound wave information;
      determine an operation to be performed by one or more smart devices based on the determined location of one or more people; and
      instruct the one or more smart devices to perform the operation.

2. The device of claim 1, wherein the plurality of microphones are configured to sense sonic sound waves concurrently with sensing reflections of the ultrasonic sound waves emitted by the one or more loudspeakers, wherein the sensed sonic sound waves are for interaction by the one or more people with the device.

3. The device of claim 1, wherein the instructions further cause the device to:
   compare the sound wave information to a baseline of the environment; and
   determine a difference between the sound wave information and the baseline, wherein determining the location of one or more people in the environment is based on the determined difference.

4. The device of claim 3, wherein the instructions further cause the device to:
- determine the sound wave information for a number of instances to be different than the baseline; and
- compare the sound wave information between the number of instances, wherein determining the location of one or more people in the environment is based on determining the sound wave information differs between the number of instances.

5. The device of claim 4, wherein the instructions further cause the device to:
- determine that the sound wave information between the number of instances is within a threshold difference from one another; and
- update the baseline based on the compared sound wave information.

6. The device of claim 5, wherein each instance of sound wave information and the baseline include a depth map indicating spatial coordinates around the device.

7. The device of claim 4, wherein the instructions further cause the device to determine a movement of the one or more people in the environment based on the sound wave information, wherein determining the operation to be performed by the one or more smart devices is further based on the determined movement of the one or more people.

8. A non-transitory, computer readable medium storing instructions that, when executed by one or more processors of a device, cause the device to:
- emit, by one or more loudspeakers, sound waves to propagate in an environment, wherein the sound waves include ultrasonic sound waves for acoustic locationing;
- sense, by a plurality of microphones, one or more reflections of the ultrasonic sound waves propagating in the environment;
- recover sound wave information from the one or more sensed reflections of the ultrasonic sound waves;
- determine a location of one or more people in the environment based on the sound wave information;
- determine an operation to be performed by one or more smart devices based on the determined location of one or more people; and
- instruct the one or more smart devices to perform the operation.

9. The computer readable medium of claim 8, wherein the instructions further cause the device to:
- sense, by the plurality of microphones, sonic sound waves concurrently with sensing reflections of the ultrasonic sound waves emitted by the one or more loudspeakers, wherein the sensed sonic sound waves are for interaction by the one or more people with the device.

10. The computer readable medium of claim 8, wherein the instructions further cause the device to:
- compare the sound wave information to a baseline of the environment; and
- determine a difference between the sound wave information and the baseline, wherein determining the location of one or more people in the environment is based on the determined difference.

11. The computer readable medium of claim 10, wherein the instructions further cause the device to:
- determine the sound wave information for a number of instances to be different than the baseline; and
- compare the sound wave information between the number of instances, wherein determining the location of one or more people in the environment is based on determining the sound wave information differs between the number of instances.

12. The computer readable medium of claim 11, wherein the instructions further cause the device to:
- determine that the sound wave information between the number of instances is within a threshold difference from one another; and
- update the baseline based on the compared sound wave information.

13. The computer readable medium of claim 12, wherein each instance of sound wave information and the baseline include a depth map indicating spatial coordinates around the device.

14. A method, comprising:
- emitting, by one or more loudspeakers of a device, sound waves to propagate in an environment, wherein the sound waves include ultrasonic sound waves for acoustic locationing;
- sensing, by a plurality of microphones of the device, one or more reflections of the ultrasonic sound waves propagating in the environment;
- recovering sound wave information from the one or more sensed reflections of the ultrasonic sound waves;
- determining a location of one or more people in the environment based on the sound wave information;
- determining an operation to be performed by one or more smart devices based on the determined location of one or more people; and
- instructing the one or more smart devices to perform the operation.

15. The method of claim 14, further comprising:
- comparing the sound wave information to a baseline of the environment; and
- determining a difference between the sound wave information and the baseline, wherein determining the location of one or more people in the environment is based on the determined difference.

16. The device of claim 7, wherein determining the movement of the one or more people in the environment includes determining at least one from the group consisting of:
- whether a person is about to leave the environment; and
- whether the person is approaching a specific object in the environment other than the device.

17. The computer readable medium of claim 8, wherein the instructions further cause the device to determine a movement of the one or more people in the environment based on the sound wave information, wherein determining the operation to be performed by the one or more smart devices is further based on the determined movement of the one or more people.

18. The computer readable medium of claim 17, wherein determining the movement of the one or more people in the environment includes determining at least one from the group consisting of:
- whether a person is about to leave the environment; and
- whether the person is approaching a specific object in the environment other than the device.

19. The method of claim 14, further comprising determining a movement of the one or more people in the environment based on the sound wave information, wherein determining the operation to be performed by the one or more smart devices is further based on the determined movement of the one or more people.

20. The method of claim 19, wherein determining the movement of the one or more people in the environment includes determining at least one from the group consisting of:
 whether a person is about to leave the environment; and
 whether the person is approaching a specific object in the environment other than the device.

* * * * *